(12) United States Patent
Foebel et al.

(10) Patent No.: US 9,646,041 B2
(45) Date of Patent: May 9, 2017

(54) TESTING OF INACTIVE DESIGN-TIME ARTIFACTS

(71) Applicants: Florian Foebel, Burstadt (DE); Bjoern Friedmann, Rheinmunster (DE); Boris Gruschko, Heidelberg (DE); Christian Mohr, Heidelberg (DE); Martin Strenge, Berlin (DE); Sascha Zorn, Schwetzingen (DE)

(72) Inventors: Florian Foebel, Burstadt (DE); Bjoern Friedmann, Rheinmunster (DE); Boris Gruschko, Heidelberg (DE); Christian Mohr, Heidelberg (DE); Martin Strenge, Berlin (DE); Sascha Zorn, Schwetzingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/312,071

(22) Filed: Jun. 23, 2014

(65) Prior Publication Data

US 2015/0149985 A1  May 28, 2015

Related U.S. Application Data

(60) Provisional application No. 61/908,710, filed on Nov. 25, 2013.

(51) Int. Cl.
| | | |
|---|---|---|
| *G06F 17/30* | (2006.01) | |
| *H04L 12/26* | (2006.01) | |
| *G06F 11/36* | (2006.01) | |
| *H04L 29/08* | (2006.01) | |
| *G06F 21/62* | (2013.01) | |
| *H04L 29/06* | (2006.01) | |

(52) U.S. Cl.
CPC .... *G06F 17/30371* (2013.01); *G06F 11/3668* (2013.01); *G06F 17/30289* (2013.01); *G06F 17/30303* (2013.01); *G06F 17/30864* (2013.01); *H04L 43/10* (2013.01); *H04L 63/083* (2013.01); *H04L 67/02* (2013.01); *G06F 21/6218* (2013.01); *H04L 63/08* (2013.01)

(58) Field of Classification Search
CPC .............................. G06F 8/60; G06F 17/30289
USPC .................................................. 717/124–131
See application file for complete search history.

(56) References Cited

U.S. PATENT DOCUMENTS

| | | | |
|---|---|---|---|
| 6,951,013 B1 * | 9/2005 | Lozins | 717/125 |
| 7,447,709 B1 * | 11/2008 | Rozenman et al. | |
| 2005/0137731 A1 * | 6/2005 | Haag | G06Q 10/087 700/97 |
| 2006/0026251 A1 * | 2/2006 | Cheng et al. | 709/207 |

(Continued)

*Primary Examiner* — Li B Zhen
*Assistant Examiner* — Daniel Wei
(74) *Attorney, Agent, or Firm* — Buckley, Maschoff & Talwalkar LLC

(57) ABSTRACT

A system includes reception of an instruction to commit a design-time artifact of a database server application to a repository of a database server, storage of the design-time artifact in the repository of the database server in association with an inactive flag, reception of a request from a user to access the design-time artifact associated with the inactive flag, and, in response to the request, generation of a private runtime representation of the design-time artifact associated with the inactive flag, and deployment of the private runtime representation of the design-time artifact for exclusive use by the user.

13 Claims, 7 Drawing Sheets

(56) References Cited

U.S. PATENT DOCUMENTS

| | | | |
|---|---|---|---|
| 2008/0069132 A1* | 3/2008 | Ellard | G06F 17/3056 370/427 |
| 2010/0153940 A1* | 6/2010 | Remmel | G06F 8/72 717/168 |
| 2012/0174013 A1* | 7/2012 | Kraus et al. | 715/771 |

* cited by examiner

ＵＳ 9,646,041 B2

TESTING OF INACTIVE DESIGN-TIME ARTIFACTS

CROSS REFERENCE TO RELATED APPLICATIONS

This application claims benefit to and priority of U.S. Patent Application Ser. No. 61/908,710, filed Nov. 25, 2013, the contents of which are hereby incorporated by reference in their entirety for all purposes.

BACKGROUND

According to conventional database architectures, a client application interacts with a database application executing on a database application server. In response to requests received from the client application, the database application acquires stored data from an underlying database system, performs any necessary processing, and provides the data to the client application. Some underlying database systems also provide application logic which is usable by a database application.

Development of a database application or application logic as described above includes creation of design-time programming artifacts. In order to test the application or application logic, the artifacts are flagged as active, validated, and compiled into corresponding runtime artifacts. The runtime artifacts are then deployed for execution. More-efficient systems for testing design-time artifacts are desired.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
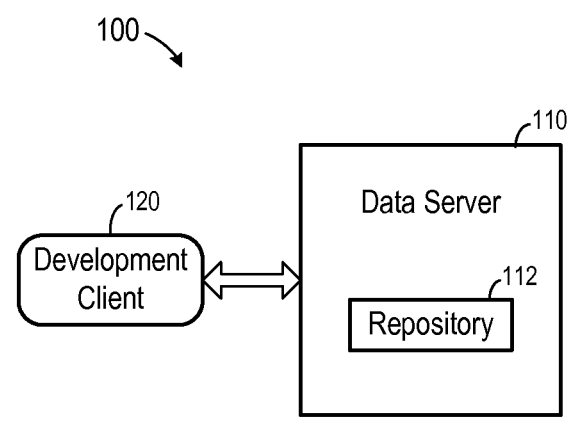
FIG. 1 is a block diagram of a design-time system according to some embodiments.

Some embodiments support testing of inactive design-time artifacts. FIG. 1 is a block diagram of system 100 according to some embodiments. System 100 includes data server 110 and development client 120.

Development client 220 may comprise a computing device executing one or more software applications for creating design-time artifacts. The one or more software applications may comprise a development environment, or suite. The design-time artifacts may comprise, but are not limited to, projects, packages, schemas, data models, procedures, etc. Design-time artifacts may be created in any programming code that is or becomes known.

As will be described in detail below, design-time artifacts may be stored in repository 112 of data server 110. Repository 112 may store data, executable code (e.g., scripts) and metadata used in the operation of data server 110 as is known in the art.

Data server 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Data server 110 may comprise any query-responsive data source or sources that are or become known, including but not limited to a structured-query language (SQL) relational database management system. Data server 110 may comprise a relational database, a multi-dimensional database, an eXtendable Markup Language (XML) document, or any other data storage system storing structured and/or unstructured data. The data of data server 110 may be distributed among several relational databases, dimensional databases, and/or other data sources. Embodiments are not limited to any number or types of data sources.

In some embodiments, the data of data server 110 may comprise one or more of conventional tabular data, row-based data, column-based data, and object-based data. Moreover, the data may be indexed and/or selectively replicated in an index to allow fast searching and retrieval thereof. Data server 110 may support multi-tenancy to separately support multiple unrelated clients by providing multiple logical database systems which are programmatically isolated from one another.

Figure 2:
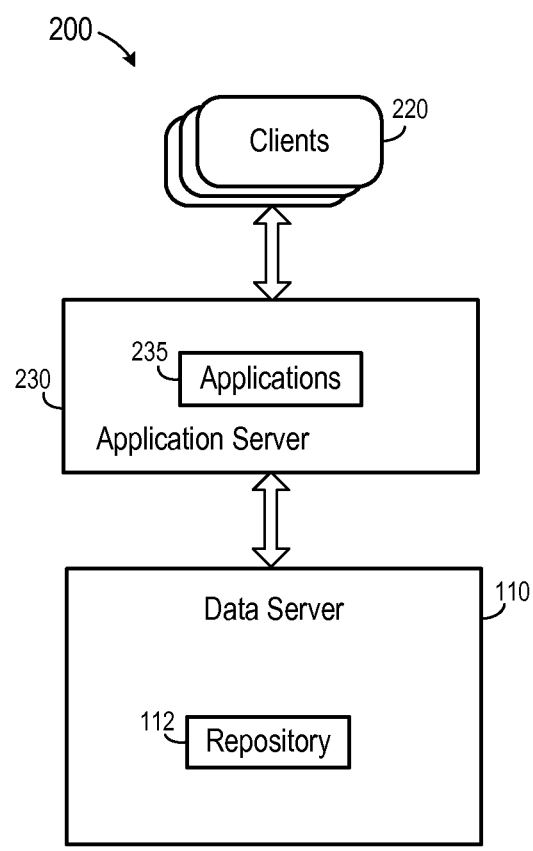
FIG. 2 is a block diagram of a runtime system according to some embodiments.

FIG. 2 is a block diagram of runtime system 200 according to some embodiments. System 200 includes data server 110, application server 230 and clients 220. Generally, application server 230 receives queries from clients 220 and provides results to clients 220 based on data of data server 110.

Application server 230 executes and provides services to applications 235. Applications 235 comprise server-side executable program code (e.g., compiled code, scripts, etc.) which provide functionality to clients 220 by providing user interfaces to clients 220, receiving requests from clients 220, retrieving data from data server 110 based on the requests, processing the data received from data server 110, and providing the processed data to clients 220. One or more of applications 235 may have been created by development system 120, with design-time artifacts of the application 235 being stored in repository 112. Applications 235 are made available for execution by application server 230 via registration and/or other procedures which are known in the art.

Application server 230 provides any suitable interfaces through which clients 220 may communicate with applications 235 executing on application server 230. For example, application server 230 may include a HyperText Transfer Protocol (HTTP) interface supporting a transient request/response protocol over Transmission Control Protocol (TCP), and/or a WebSocket interface supporting non-transient full-duplex communications between application server 230 and any clients 220 which implement the WebSocket protocol over a single TCP connection.

One or more applications 235 executing on server 230 may communicate with data server 110 using database management interfaces such as, but not limited to, Open Database Connectivity (ODBC) and Java Database Connectivity (JDBC) interfaces. These types of applications 235 may use Structured Query Language (SQL) to manage and query data stored in data server 110.

Application server 230 may be separated from or closely integrated with data server 110. A closely-integrated application server 230 may enable execution of server applications 235 completely on the database platform, without the need for an additional application server. For example, according to some embodiments, application server 230 provides a comprehensive set of embedded services which provide end-to-end support for Web-based applications. The services may include a lightweight web server, configurable support for Open Data Protocol, server-side JavaScript execution and access to SQL and SQLScript.

Application server 230 may provide application services (e.g., via functional libraries) using which applications 235 may manage and query the data of data server 110. The application services can be used to expose the database data model, with its tables, views and database procedures, to clients. In addition to exposing the data model, application server 230 may host system services such as a search service.

Data server 110 may also provide application logic, such as database procedures and/or calculations, according to some embodiments. This application logic may be created by development system 120, and design-time artifacts of the application logic may be stored in repository 112. The application logic may comprise scripts, functional libraries and/or compiled program code.

Each of clients 220 may comprise one or more devices executing program code of a software application for presenting user interfaces to allow interaction with application server 230. The user interfaces may comprise user interfaces suited for reporting, data analysis, and/or any other functions based on the data of data server 110. The user interfaces may also or alternatively comprise interfaces for administration of application server 230, data server 110 and/or applications 235 of application server 230.

Presentation of a user interface may comprise any degree or type of rendering, depending on the type of user interface code generated by application server 230. For example, a client 220 may execute a Web Browser to request and receive a Web page (e.g., in HTML format) from application server 230 via HTTP, HTTPS, and/or WebSocket, and may render and present the Web page according to known protocols. One or more of clients 220 may also or alternatively present user interfaces by executing a standalone executable file (e.g., an .exe file) or code (e.g., a JAVA applet) within a virtual machine.

Figure 3:
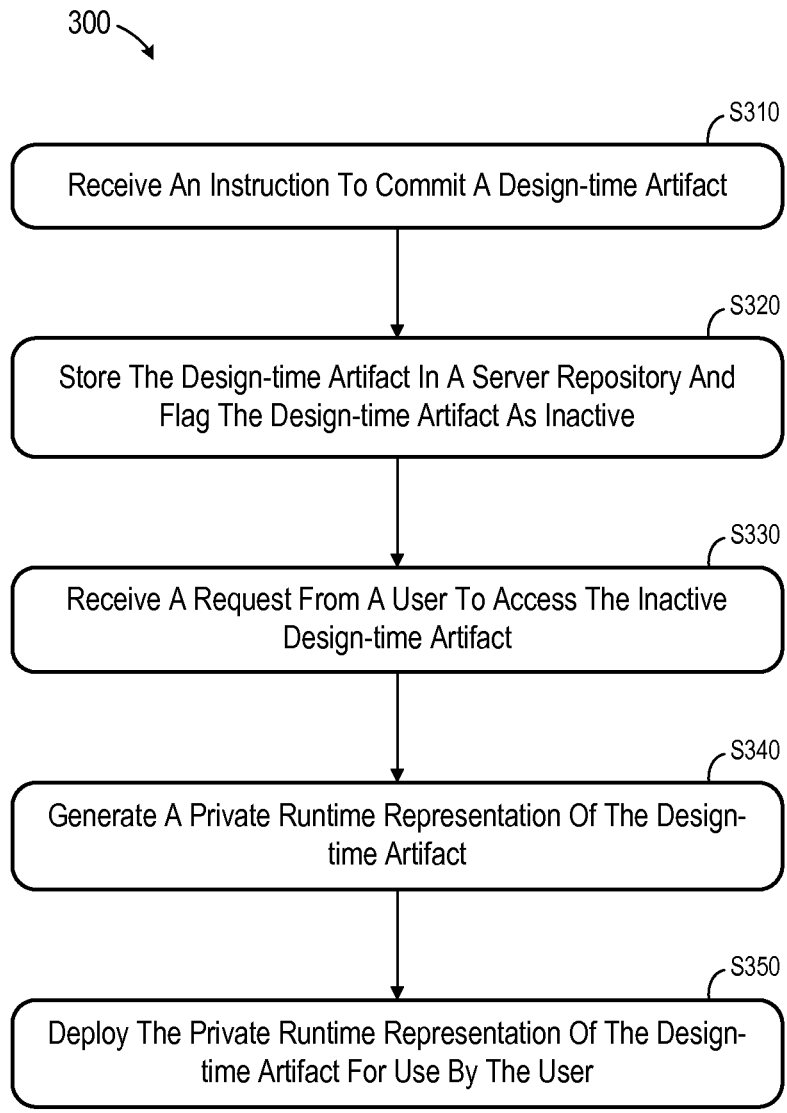
FIG. 3 is a flow diagram of a process according to some embodiments.

FIG. 3 comprises a flow diagram of process 300 according to some embodiments. In some embodiments, various hardware elements of application server 230 (e.g., one or more processors) execute program code to perform process 300. Process 300 and all other processes mentioned herein may be embodied in processor-executable program code read from one or more of non-transitory computer-readable media, such as a floppy disk, a disk-based or solid-state hard drive, CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S310, an instruction is received to commit a design-time artifact. The design-time artifact is created prior to S310, for example through user interaction with development client 120. According to one example, a developer interacts with a development environment executing on development client 120 to create code representing a design-time artifact.

A design-time artifact may comprise any entity which provides application structure (e.g., projects and packages), data organization (e.g., schemas, table definitions, or analytical and attribute views), access to runtime objects, and/or functionality (e.g., procedures and server-side JavaScript code). Embodiments are not limited to the artifacts listed above. According to some embodiments, the developer creates a directory structure, known as a repository workspace, on development client 120. Next, the developer creates a project for grouping together all the artifacts for a specific part of the application-development environment. A design-time artifact is then created and saved to the project.

The developer may manipulate a user interface displayed by development client 120 in order to issue the instruction to commit the design-time artifact. After reception of the instruction at S310. The design-time artifact is stored in a repository and flagged as inactive.

Figure 4:
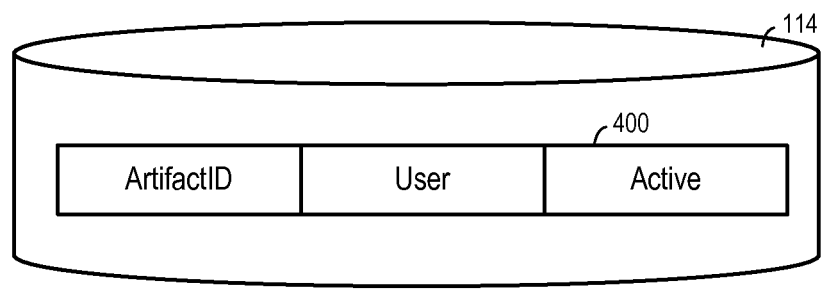
FIG. 4 illustrates a portion of a database table according to some embodiments.

According to some embodiments of S320, the design-time artifact is stored in repository 112 of data server 110. FIG. 4 illustrates a tabular representation of metadata 400 associated with design-time artifacts which are stored in repository 112. Metadata 400 may also be stored in repository 400. According to this example, metadata 400 associates each design-time artifact with an ArtifactID, a user (i.e., identifying the developer who committed the artifact) and an "Active" flag. The Active flag specifies whether the artifact is active or inactive. Generally, artifacts flagged as active are validated and compiled as runtime objects which are executed at runtime.

Metadata 400 may include any other suitable information for each artifact, including but not limited to information specifying the project and other associations of the artifact. For example, a stored artifact which is flagged as inactive may be a test version of another stored artifact which is flagged as active. Metadata 400 may include information indicating this relationship.

Next, at S330, a request is received from a user to access the inactive design-time artifact. The request may be received from development client 120. In response to the request, a private runtime representation of the design-time artifact is generated at S340. Generation of the private runtime representation comprises compiling the design-time artifact. According to some embodiments, prior to generation of the runtime representation, it is determined whether the user from whom the request was received is associated with the design-time artifact within metadata 400, or is otherwise authorized to access the design-time artifact. At S350, the private runtime representation is deployed for use by the user.

Generation and deployment of the private runtime representation according to some embodiments differs from traditional activation of the design-time artifact. According to traditional artifact activation, a user issues a command to activate an artifact. The artifact is then published, rendering it visible to other users. The previously-active version of the artifact (if any) is added to the version history. The artifact is validated and compiled into a runtime object, and then deployed for use by other users. In contrast, the private runtime representation is only visible to the developer and deployed to the developer.

Accordingly, the developer may operate one of clients 220 to execute one of applications 235. The "inactive" design-time artifact of the above example may be an element of the executed application 235. In such a case, and due to process 300, the private runtime representation of the "inactive" artifact application is used in the execution of the application 235.

According to some embodiments, the request received at S330 may comprise a request to access all inactive design-time artifacts associated with the user. As a result, private runtime representations of all design-time artifacts are generated at S340 and deployed at S350. This implementation allows testing of complementary changes made to several design-time artifacts at once.

Moreover, repository 112 may store inactive design-time artifacts respectively associated with each of several users. If one of these users issues a request to access all inactive design-time artifacts associated with the one user, private runtime representations of only those inactive design-time artifacts associated with the one user will be generated at S340 and deployed at S350.

Figure 5:
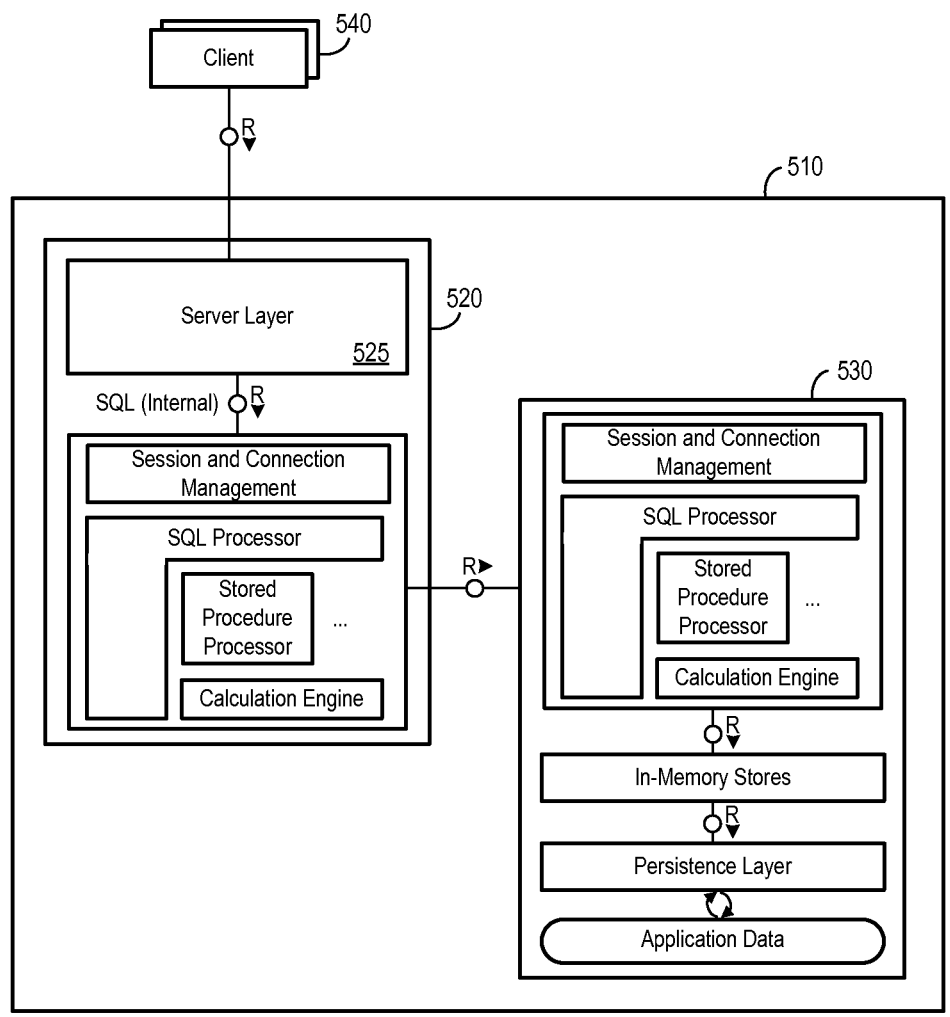
FIG. 5 is a detailed block diagram of an application server according to some embodiments

FIG. 5 illustrates database platform 510 integrating web-based application server 520 and index server 530 according to some embodiments. Application server 520 may enable execution of server applications completely on database platform 510, without the need for an additional application server. In this regard, database platform 510 may comprise an implementation of application server 230 and data server 110 of FIG. 2.

Clients 540 send their requests to database platform 510 via HTTP, which may include requests for WebSocket connections. Clients 540 may be Web browsers, mobile applications, or other applications that consume resources and services provided by server applications. According to some embodiments, the presentation logic is run on clients 540.

Server 520 runs services that accept the HTTP requests and maps them to database queries and stored procedure calls. Data-intensive logic may be executed in index server 530 (using SQL, SQLScript, views, L procedures, C++, etc.).

In this regard, web application server 520 can be viewed as an index server with server layer 525 on top. However, according to some embodiments, no application data is stored in Web application server 520 itself. If server layer 525 needs to access tables or views or needs to call a stored procedure, it uses the illustrated internal SQL API to open a local database connection and then sends an SQL statement to the SQL processor in the web application server 520. The statement is processed by the SQL processor or by the calculation engine of web application server 510.

The SQL processor and the calculation engine delegate the execution to the index server 530 which manages the required data. This delegation may be similar to the mechanism used in a distributed database system including multiple index servers. In contrast, however, web application server 520 delegates the execution of database operations because it does not store application tables. Integration of server 520 into database platform 510 may lead to simplified administration and a better development experience.

Figure 6:
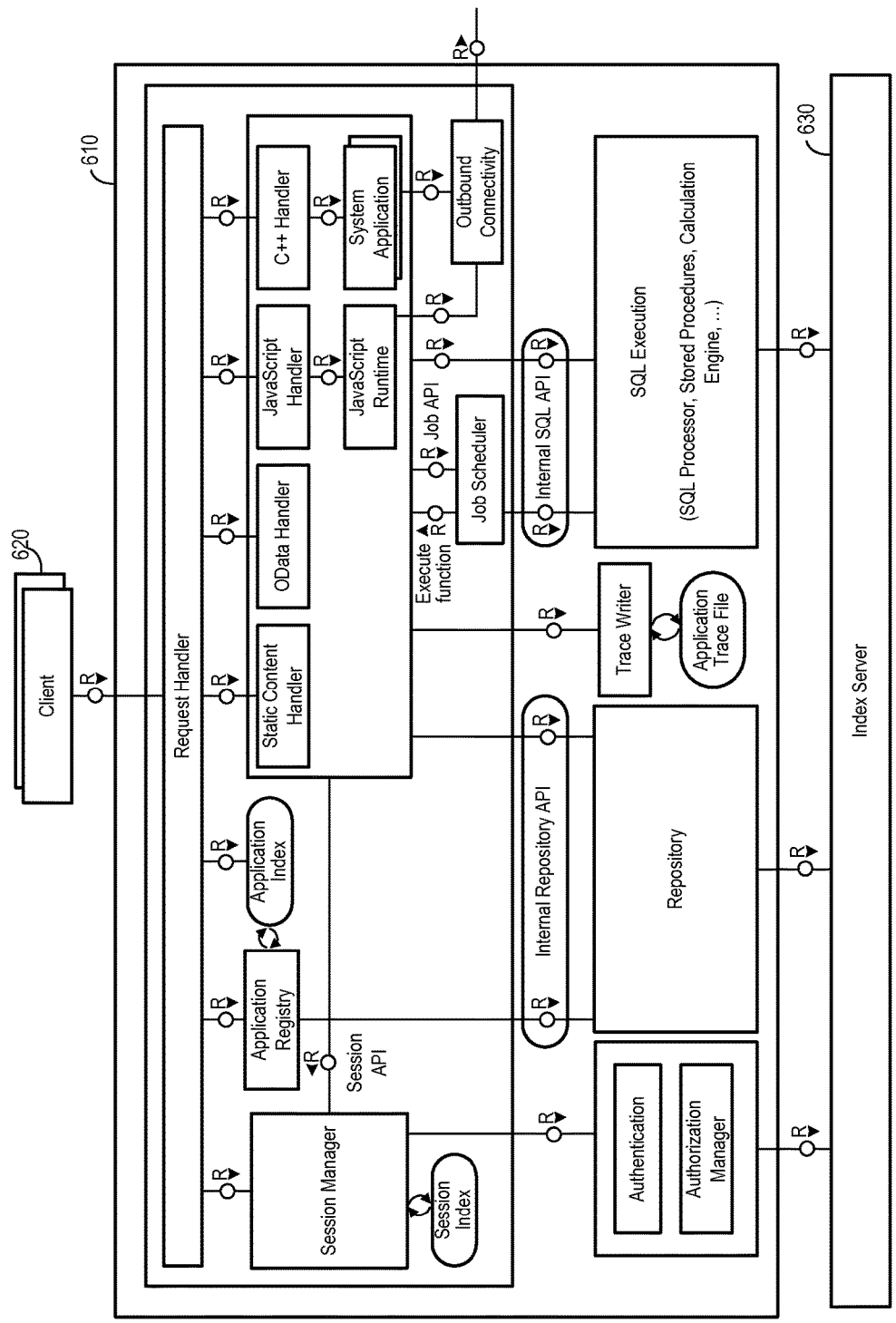
FIG. 6 is a detailed block diagram of an application server according to some embodiments.

FIG. 6 is a detailed block diagram of Web application server 610 according to some embodiments. Server 610 may comprise an implementation of application server 230 of FIG. 1, while index server 630 may comprise an implementation of data server 110.

Incoming requests from clients 620 are received by the request handler. The request handler first determines the server-side application to which the requested resource belongs by invoking the application registry, which maintains a list of all active applications. The application registry initially reads this information from runtime storage tables located in the master index server and caches the information in its application index. After the application is determined, optional Uniform Resource Locator (URL) rewriting rules are applied. URL rewriting rules can be defined for each application to map between external URLs and corresponding internal technical URLs.

The request handler then invokes the session manager. The session manager either relates the request to an existing session or starts a new session. The session manager is responsible for session authentication. A developer may specify, on the package level, whether authentication is required for accessing the resources. Server 610 may support several authentication mechanisms, including but not limited to SAML, SAP assertion ticket, SAP logon ticket, Kerberos, X.509 certificates, and user and password using HTTP basic authentication or form-based logon.

After successful authentication, the request handler forwards the request to the responsible resource handler of server 610. FIG. 6 illustrates several different resource handlers for different types of resources.

The static content handler is called for content such as Hypertext Markup Language (HTML) files, client side scripts, or images. The static content handler retrieves the resources from the runtime storage.

The OData handler is invoked if the requested resource belongs to an OData service. If the client requests the service definition, the OData handler returns a document including the metadata about the service. This document is generated during the activation of the service descriptor which was written by the developer. If the client requests actual data, the OData handler constructs the required database statements and invokes them using the internal SQL API. The OData handler transforms the query results into the format requested by the client, which can be either Atom (content type "atom+XML") or JSON. As explained above, developers can specify application specific code to be called for validating or executing OData write requests. In this case the OData handler calls the specified code, which may be SQLScript procedures or JavaScript functions.

The JavaScript handler is invoked if the requested resource is a server-side JavaScript application such as those described herein. Embodiments may support server-side applications written in other programming languages. The JavaScript handler reads the runtime object with the JavaScript byte code from the runtime storage tables, and invokes the JavaScript runtime for executing it. The JavaScript runtime also contains an implementation of JavaScript APIs. If such an API is called, the JavaScript runtime invokes the responsible component, such as the session manager, the outbound HTTP client, the trace writer, or the internal SQL API.

The outbound HTTP client is used to send HTTP/S requests to an external server. The connection details of the remote server need to be specified in advance by creating an HTTP destination configuration. The internal SQL API invokes an SQL execution chain. The SQL executor and the calculation engine in server 610 delegate the actual data operations to the index server where the data resides.

The C++ handler is responsible for resources and services exposed by system applications that are written in C++. These system applications have the same lifecycle as the database platform and are part of the database build. One example is a Direct Extractor Connection (DXC) that allows DataSource extractor-based data replication between clients and the database platform via HTTP. DataSource extractors in the client are redirected to send extracted data to the database platform system via HTTP. The data is received by the DXC system application in the server, which stores it in the database.

Figure 7:
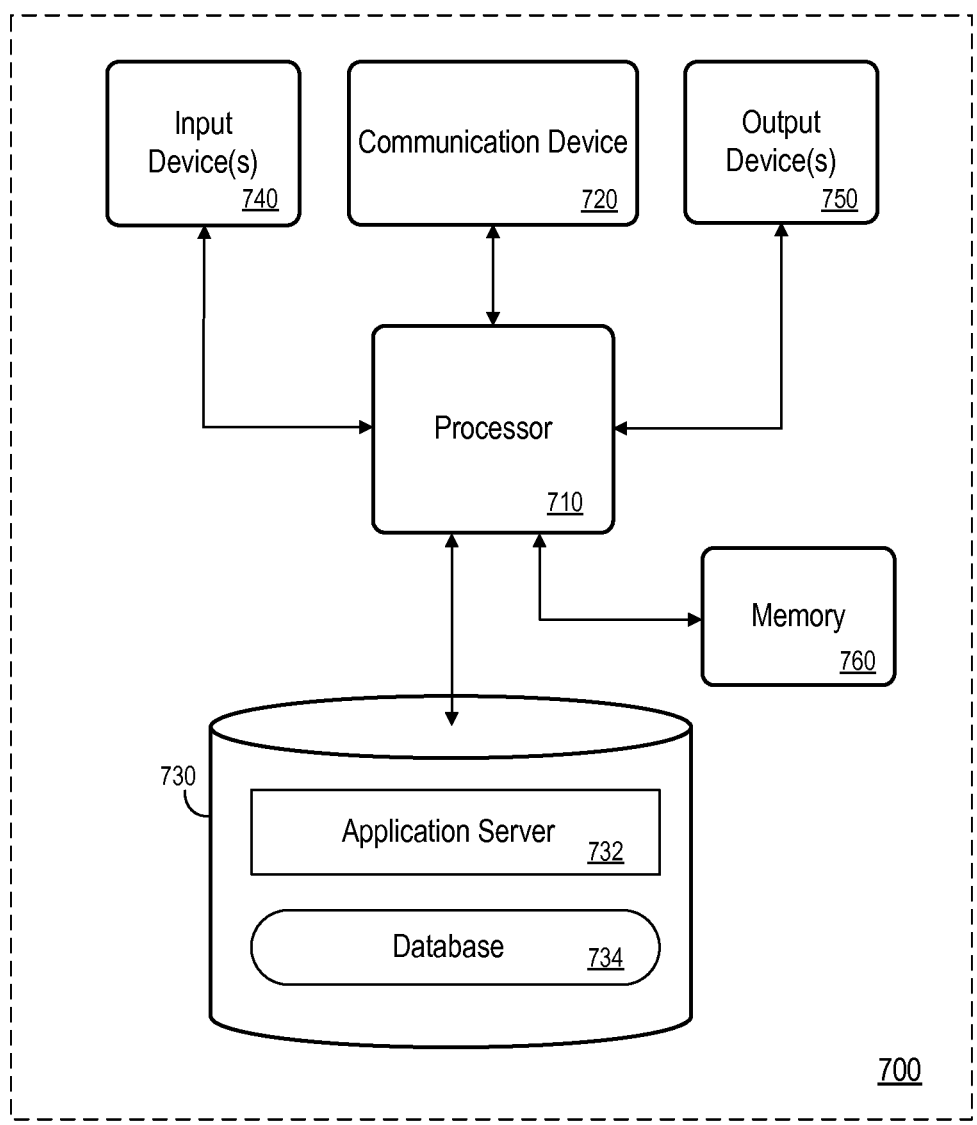
FIG. 7 is a block diagram of an apparatus according to some embodiments.

FIG. 7 is a block diagram of apparatus 700 according to some embodiments. Apparatus 700 may comprise a general-purpose computing apparatus and may execute program code to perform any of the functions described herein. Apparatus 700 may comprise an implementation of application server 230 and data server 110 of FIG. 2 in some embodiments. Apparatus 700 may include other unshown elements according to some embodiments.

Apparatus 700 includes processor 710 operatively coupled to communication device 720, data storage device 730, one or more input devices 740, one or more output devices 750 and memory 760. Communication device 720 may facilitate communication with external devices, such as a reporting client, or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM).

Application server 732 may comprise program code executed by processor 710 to cause apparatus 700 to perform any one or more of the processes described herein. Embodiments are not limited to execution of these processes by a single apparatus. Database 734 may include database data as described above. As also described above, database data (either cached or a full database) may be stored in volatile memory such as memory 760. Data storage device 730 may also store data and other program code for providing additional functionality and/or which are necessary for operation of apparatus 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable process steps; and
a processor to execute the processor-executable process steps to cause the system to:
receive an instruction to commit a design-time artifact of a database server application and metadata associated with the design-time artifact to a repository of a database server;
associate the design-time artifact with a flag that indicates an active state of the design-time artifact or an inactive state of the design-time artifact, wherein the design-time artifact is a database procedure or an analytical view and wherein in a case that the design-time artifact is associated with a flag that indicates an inactive state, the metadata stored in the repository indicates that the design-time artifact is a test version of a second design-time artifact that is associated with a flag that indicates an active state;
store the design-time artifact in the repository of the database server in association with the flag;
set the flag to indicate the inactive state;
receive a request from a user to access the design-time artifact associated with the flag set to the inactive state; and
in response to the request, and based on the flag indicating the inactive state, generate a private runtime representation of the design-time artifact and deploy the private runtime representation of the design-time artifact for exclusive use by the user.

2. A system according to claim 1, wherein the processor is further to execute the processor-executable process steps to cause the system to:
store a second design-time artifact in the repository of the database server in association with a second flag set to the inactive state; and
in response to the request, and based on the second flag indicating the inactive state, generate a second private runtime representation of the second design-time artifact, and deploy the second private runtime representation of the design-time artifact for exclusive use by the user.

3. A system according to claim 1, wherein the instruction is received from the user.

4. A computer-implemented method comprising:
receiving an instruction to commit a design-time artifact of a database server application and metadata associated with the design-time artifact to a repository of a database server;
associating the design-time artifact with a flag that indicates an active state of the design-time artifact or an inactive state of the design-time artifact, wherein the design-time artifact is a database procedure or an analytical view and wherein in a case that the design-time artifact is associated with a flag that indicates an inactive state, the metadata stored in the repository indicates that the design-time artifact is a test version of a second design-time artifact that is associated with a flag that indicates an active state;
storing the design-time artifact in the repository of the database server in association with the flag;

setting the flag to indicate the inactive state;
receiving a request from a user to access the design-time artifact associated with the flag set to the inactive state; and
in response to the request, and based on the flag indicating the inactive state, generating a private runtime representation of the design-time artifact, and deploying the private runtime representation of the design-time artifact for exclusive use by the user.

5. A computer-implemented method according to claim 4, further comprising:
storing a second design-time artifact in the repository of the database server in association with a second flag set to the inactive state; and
in response to the request, and based on the second flag indicating the inactive state, generating a second private runtime representation of the second design-time artifact, and deploying the second private runtime representation of the design-time artifact for exclusive use by the user.

6. A computer-implemented method according to claim 4, wherein the instruction is received from the user.

7. A non-transitory computer-readable medium storing program code, the program code executable by a computer system to cause to the computer system to:
receive an instruction to commit a design-time artifact of a database server application and metadata associated with the design-time artifact to a repository of a database server;
associating the design-time artifact with a flag that indicates an active state of the design-time artifact or an inactive state of the design-time artifact, wherein the design-time artifact is a database procedure or an analytical view and wherein in a case that the design-time artifact is associated with a flag that indicates an inactive state, the metadata stored in the repository indicates that the design-time artifact is a test version of a second design-time artifact that is associated with a flag that indicates an active state;
store the design-time artifact in the repository of the database server in association with the flag;
set the flag to indicate the inactive state;
receive a request from a user to access the design-time artifact associated with the flag set to the inactive state; and
in response to the request, and based on the flag indicating the inactive state, generate a private runtime representation of the design-time artifact and deploy the private runtime representation of the design-time artifact for exclusive use by the user.

8. A medium according to claim 7, wherein the program code is further executable by a computer system to cause to the computer system to:
store a second design-time artifact in the repository of the database server in association with a second flag set to the inactive state; and
in response to the request, and based on the second flag indicating the inactive state, generate a second private runtime representation of the second design-time artifact, and deploy the second private runtime representation of the design-time artifact for exclusive use by the user.

9. A medium according to claim 7, wherein the instruction is received from the user.

10. The system of claim 1, wherein in a case that the design-time artifact is associated with a flag that indicates an active state, the design-time artifact is compiled as a runtime object and is executed at runtime.

11. The system of claim 1, wherein the user is a developer that committed the design-time artifact to the repository.

12. The system of claim 1, wherein the received request comprises a request to access all design-time artifacts associated with a flag set to the inactive state.

13. The system of claim 1, wherein the private runtime representation of the design-time artifact is associated with an application that comprises the design-time artifact associated with the flag set to the inactive state and wherein the private runtime representation of the design-time artifact associated with the flag set to the inactive state comprises execution of the application including the design-time artifact associated with the flag set to the inactive state.

* * * * *